United States Patent
Wu

(10) Patent No.: US 11,113,102 B2
(45) Date of Patent: Sep. 7, 2021

(54) DATA STORAGE DEVICE

(71) Applicant: Silicon Motion, Inc., Jhubei (TW)

(72) Inventor: Jyun-Han Wu, Kaohsiung (TW)

(73) Assignee: SILICON MOTION, INC., Jhubei (TW)

( * ) Notice: Subject to any disclaimer, the term of this patent is extended or adjusted under 35 U.S.C. 154(b) by 40 days.

(21) Appl. No.: 16/416,327

(22) Filed: May 20, 2019

(65) Prior Publication Data

US 2020/0065140 A1 Feb. 27, 2020

Related U.S. Application Data

(60) Provisional application No. 62/720,942, filed on Aug. 22, 2018.

(30) Foreign Application Priority Data

Dec. 4, 2018 (TW) .................................. 107143390

(51) Int. Cl.
*G06F 9/48* (2006.01)
*G06F 9/54* (2006.01)
*G06F 9/38* (2018.01)

(52) U.S. Cl.
CPC .......... *G06F 9/4881* (2013.01); *G06F 9/3877* (2013.01); *G06F 9/544* (2013.01)

(58) Field of Classification Search
CPC .................................................... G06F 9/4881
See application file for complete search history.

(56) References Cited

U.S. PATENT DOCUMENTS

| 6,427,189 | B1 | 7/2002 | Mulla et al. |
| 8,341,332 | B2 | 12/2012 | Ma et al. |
| 2010/0262721 | A1* | 10/2010 | Asnaashari ............. G06F 3/067 710/5 |
| 2011/0055458 | A1 | 3/2011 | Kuehne |
| 2016/0291867 | A1* | 10/2016 | Olcay ..................... G06F 13/28 |
| 2016/0292007 | A1* | 10/2016 | Ding ..................... G06F 9/5077 |
| 2017/0277633 | A1 | 9/2017 | Wilkerson et al. |

FOREIGN PATENT DOCUMENTS

| TW | I235916 B | 7/2005 |
| TW | M369528 U1 | 11/2009 |
| TW | 201510723 A | 3/2015 |
| TW | 201734806 A | 10/2017 |

* cited by examiner

*Primary Examiner* — Sisley N Kim
(74) *Attorney, Agent, or Firm* — McClure, Qualey & Rodack, LLP

(57) ABSTRACT

A data storage device with a controller using a central processing unit (CPU) in a multi-stage architecture is shown. The processing systems of the different stages communicate with each other. In a first processing system, a command controller is provided to implement the first processing system as a transmitting end, and the command controller includes a plurality of command queues. When a first command is queued in a first command queue for transmission, a first processor of the first processing system fills a second command into a second command queue for transmission.

8 Claims, 5 Drawing Sheets

DATA STORAGE DEVICE

CROSS REFERENCE TO RELATED APPLICATIONS

This Application claims the benefit of U.S. Provisional Application No. 62/720,942, filed Aug. 22, 2018, the entirety of which is incorporated by reference herein.

This Application also claims priority of Taiwan Patent Application No. 107143390, filed on Dec. 4, 2018, the entirety of which is incorporated by reference herein.

BACKGROUND OF THE INVENTION

Field of the Invention

The present invention relates to controller architecture of a data storage device.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on. These non-volatile memories may be used as the storage medium of a data storage device.

In a data storage device, a non-volatile memory is controlled by a controller. The design of the controller is an important topic in this technical field.

BRIEF SUMMARY OF THE INVENTION

A central processing unit (CPU) in a multi-stage architecture is shown, which implements a controller of a data storage device. To transfer commands between the different stages of the CPU, multiple command queues are provided at the transmitting end. Multiple commands can be queued in the command queues to be transmitted to the receiving end as soon as possible. In an exemplary embodiment, a first command is stored in a first command queue and a second command is stored in a second command queue. The storage of the second command in the second command queue does not depend on the status of the first command. When the transfer of the first command from the transmitting end to the receiving end is confirmed, an acknowledgement signal is returned from the receiving end. According to the disclosure, the second command can be ready in the second command queue even though the acknowledgement signal has not been returned. According to the acknowledgement signal, the second command prepared in the second command queue can be immediately transferred to the receiving end.

In an exemplary embodiment, there are multiple storage devices at the receiving end. The different command queues at the transmitting end correspond to the different storage devices at the receiving end. In an exemplary embodiment, the first command queue corresponds to a first storage device, and the second command queue corresponds to a second storage device. The first storage device is the destination for the first command queued in the first command queue. The second storage device is the destination for the second command queued in the second command queue. The second command is pushed to the second command queue without being delayed by the status of the first command. When the first command is written to the first storage device, an acknowledgement signal is returned to the transmitting end. According to the disclosure, the second command can be ready in the second command queue even though the acknowledgement signal has not been returned. According to the acknowledgement signal, the second command prepared in the second command queue can be immediately transferred to the second storage device.

In an exemplary embodiment, a multi-core architecture is used at the receiving end. There are multiple processors at the receiving end and each processor is equipped with a storage device. The first command queue at the transmitting end corresponds to the first processor at the receiving end, and stores commands waiting to be transmitted to the first storage device that corresponds to the first processor. The second command queue at the transmitting end corresponds to the second processor at the receiving end, and stores commands waiting to be transmitted to the second storage device that corresponds to the second processor. The first storage device is the destination for the first command queued in the first command queue. The second storage device is the destination for the second command queued in the second command queue. The second command is pushed to the second command queue without being delayed by the status of the first command. When the first command is written to the first storage device of the first processor at the receiving end, an acknowledgement signal is returned to the transmitting end. According to the disclosure, the second command can be ready in the second command queue even though the acknowledgement signal has not been returned. According to the acknowledgement signal, the second command prepared in the second command queue can be immediately transferred to the second storage device of the second processor at the receiving end.

In an exemplary embodiment, the commands queued in the command queues are alternately transferred through a communication interface between the transmitting end and the receiving end in a Round Robin scheduling manner.

In an exemplary embodiment, each of the command queues includes a first-in first-out buffer. The command queue capability, therefore, is improved.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion uses flash memory as an example.

Flash memory is often used as a storage medium in today's data storage devices. Flash memory is often implemented in memory cards, USB flash devices, SSDs, and so on. In another exemplary embodiment, a flash memory may be packaged with a controller to form a multiple-chip package named eMMC.

A data storage device using a flash memory as a storage medium can be applied in a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Figure 1:
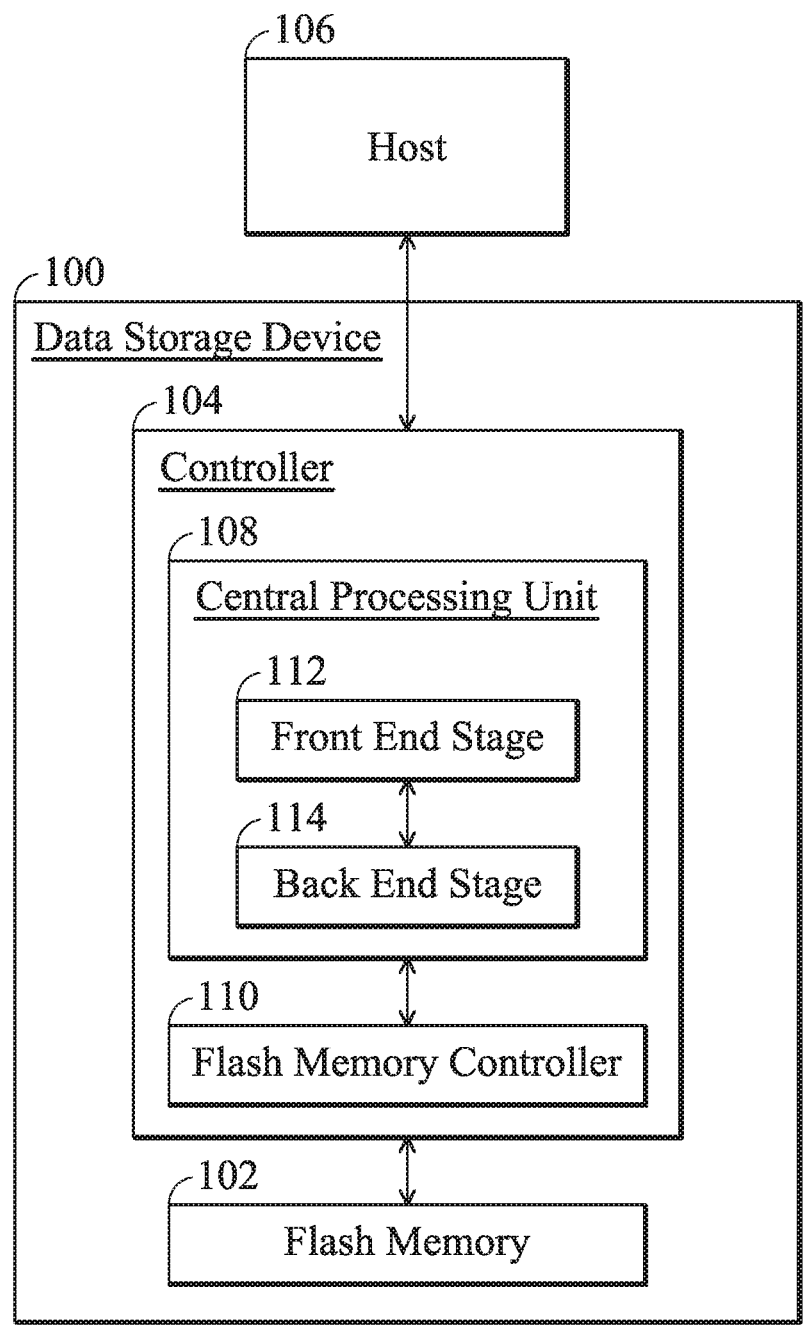
FIG. 1 is a block diagram depicting a data storage device 100 in accordance with an exemplary embodiment of the disclosure.

A data storage device uses a controller to operate a flash memory in accordance with commands from a host (host commands). FIG. 1 is a block diagram depicting a data storage device 100 in accordance with an exemplary embodiment of the disclosure.

The data storage device 100 includes a flash memory 102 and a controller 104. The data storage device 100 may further use a dynamic random access memory (DRAM) as a temporary storage device. The DRAM may be configured in the data storage device 100 or is simulated by a DRAM at the host 106 side. The host 106 may control the data storage device 100 through a PCIe interface, a SATA interface or a SAS (Serial Attached SCSI) interface, to communicate with the controller 104 according to a non-volatile memory express (NVMe) or an AHCI protocol.

The controller 104 has a central processing unit (CPU) 108 and a flash memory controller (e.g., a NAND flash controller, NFC for short) 110. According to host commands, the central processing unit 108 operates the flash memory controller 110 to read/write the flash memory 102 or manage the flash memory 102.

The central processing unit 108 is implemented in a multi-stage architecture. As shown, the central processing unit 108 is divided into at least two stages, including a front end (FE) stage 112 and a back end (BE) stage 114. Commands are transferred between the front end (FE) stage 112 and the back end (BE) stage 114. The front end (FE) stage 112 is mainly responsible for the preliminary processing of the host commands received from the host 106. After completing the reception, scheduling, and debug of a host command or downloading user data indicated by a host command, the front end (FE) stage 112 may transmit the host command to the back end (BE) stage 114 for execution. For example, in the back end (BE) stage 114, the host command transferred from the front end (FE) stage 112 is converted into an operational command. According to the operational command, the flash memory controller 110 operates the flash memory 102. The operational command may be a read command, a write command, a delete command, a reset command, a Get Feature command or a Set Feature command. According to the execution performed by the flash memory controller 110, an execution result regarding the host command is generated in the back end (BE) stage 114 and returned to the front end (FE) stage 112.

In order to speed up the processing of the host command, multiple command queues (detailed in the figures) are provided in the front end (FE) stage 112. Multiple host commands can be queued in the command queues to be transmitted to the back end (BE) stage 114 in time. The multiple command queues are preferably provided by an internal memory (preferably SRAM) of the central processing unit (CPU) 108. In some exemplary embodiment, the multiple command queues are provided by a DRAM. In an exemplary embodiment, two command queues are provided in the front end (FE) stage 112. There are four commands. The $1^{st}$ and $2^{nd}$ host commands are queued in the first command queue and the $3^{rd}$ and the $4^{th}$ host commands are queued in the second command queue. The $1^{st}$ host command queued in the first command queue and the $3^{rd}$ host command queued in the second command queue may be transferred from the front end (FE) stage 112 to the back end (BE) stage 114 simultaneously or one by one. The $2^{nd}$ host command queued in the first command queue is transferred from the front end (FE) stage 112 to the back end (BE) stage 114 after the execution of the $1^{st}$ host command is completed (e.g., the execution result of the $1^{st}$ host command shows "success"). The $4^{th}$ host command queued in the second command queue is transferred from the front end (FE) stage 112 to the back end (BE) stage 114 after the execution of the $3^{rd}$ host command is completed (e.g., the execution result of the $3^{rd}$ host command shows "success").

In conclusion, the more command queues there are, the more host commands are allowed to be transferred from the front end (FE) stage 112 to the back end (BE) stage 114 in parallel (at the same time or one by one). The transfer of the next host command is not put on hold to wait for the complete execution of the current host command. The command queues may operate independently of each other. When the execution of one host command finishes, the front end (FE) stage 112 can immediately transmit the next host command queued in the same command queue to the back end (BE) stage 114, without being delayed by the execution of the host commands received by the receiving end from the other command queues. The central processing unit (CPU) 108 executes host commands in a very efficient manner.

In an exemplary embodiment, multiple storage devices are provided in the back end (BE) stage 114 to correspond to the different command queues in the front end (FE) stage 112.

Figure 2:
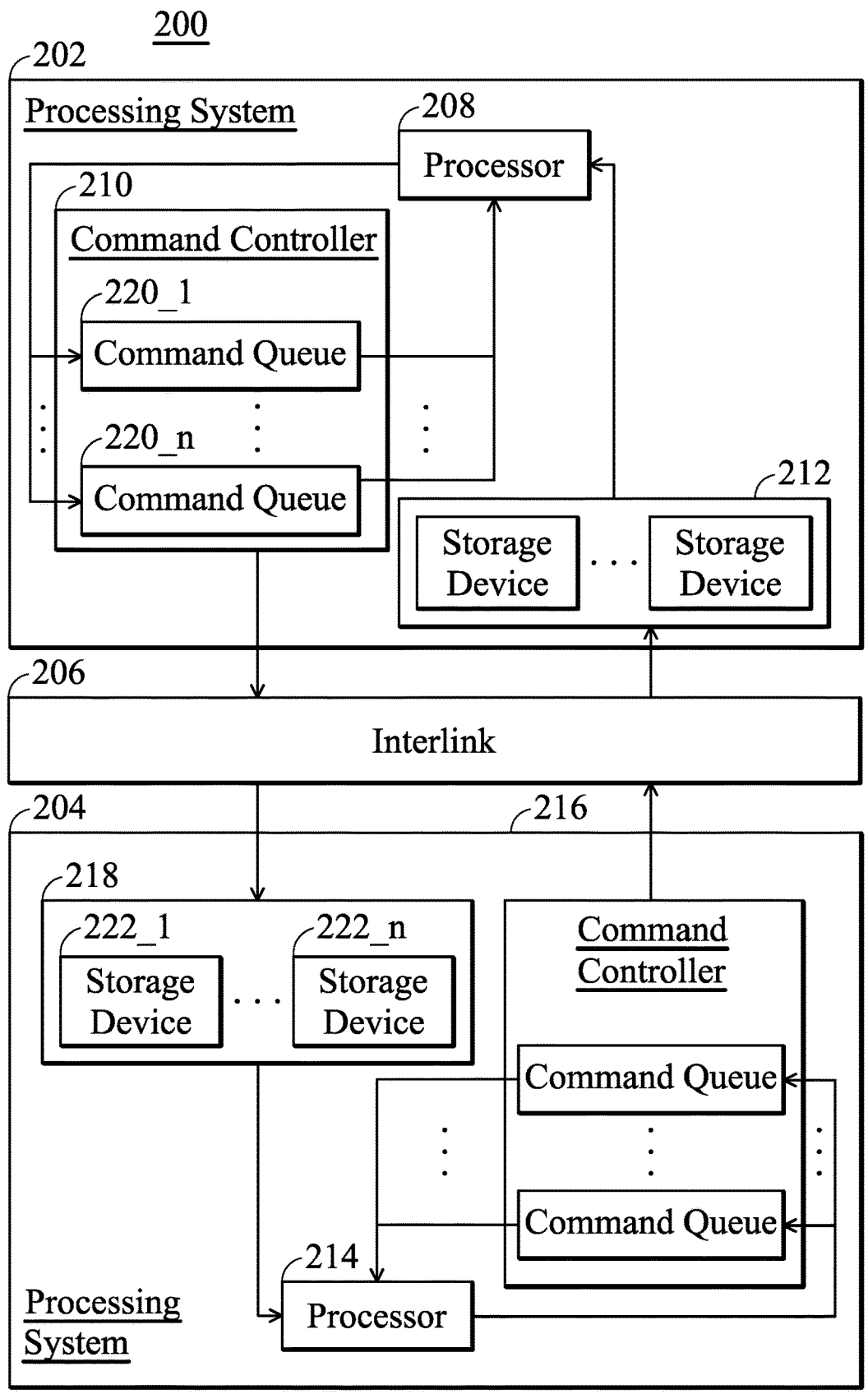
FIG. 2 is a block diagram depicting a central processing unit 200 in accordance with an embodiment of the disclosure.

FIG. 2 is a block diagram depicting a central processing unit 200 in accordance with an embodiment of the disclosure. There is a processing system 202 that is regarded as the front end (FE) stage and a processing system 204 that is regarded as the back end (BE) stage. The processing system 202 and the processing system 204 are connected by an interlink 206. In an exemplary embodiment, communication through the interlink 206 is implemented by an advanced extensible interface (AXI). The processing system 202 includes a processor 208, a command controller 210, and a storage module 212. The processing system 204 includes a processor 214, a command controller 216, and a storage module 218. A host command that the processor 208 fills into one command queue in the command controller 210 is transferred to one storage device of the storage module 218 through the interlink 206. A response command that the processor 214 filled into a command queue in the command controller 216 is transferred to one storage device of the storage module 212 through the interlink 206. The response command may indicate whether the host command transferred from the processing system 202 to the processing system 204 has been successfully executed or not. Both processing system 202 and processing system 204 have an opportunity to be the transmitting end or the receiving end of a command. The following discussion relates to transmission from the front end (FE) stage to the back end (BE) stage. Another transmission direction from the back end (BE) stage to the front end (FE) stage may be implemented by a similar mechanism.

As shown, the command controller 210 includes command queues $220\_1 \ldots 220\_n$ corresponding to storage devices $222\_1 \ldots 222\_n$ of the memory module 218 within the processing system 204, respectively. Each command queue may include a plurality of registers for storage of parameters related to host commands. The parameters may include destination address (indicating one storage device among $222\_1 \ldots 222\_n$ as the destination for the transferred host command), command details (OP code, command operands, etc.), byte enable signals, etc. The storage devices $222\_1$ to $222\_n$ may be implemented by a dynamic random access memory (DRAM), static random access memory (SRAM), mailbox (mailbox), and the like. To transmit a host command Cmd_i (i is a number) to the processing system 204, the processor 208 writes the destination address to a register of a command queue $220\_i$, and then the command controller 210 transforms the contents of the command queue $220\_i$ to a transmission format (e.g., according to an AXI protocol) to be transmitted via the interlink 206. The host command Cmd_i is received by the processing system 204 and written to the storage device $222\_i$ in the storage module 218. An acknowledgement signal (ACK) is sent back to the command controller 210 to indicate that the host command Cmd_i has been received. Since the transmission of the host command Cmd_i has been completed, the interlink 206 may enter a standby state or a ready state to wait for the next transmission mission. The command controller 210 may return an ending signal to inform the processor 208 of the complete transmission of a host command. At the receiving end, the processor 214 accesses the storage device $222\_i$ for the received host command Cmd_i and executes the host command Cmd_i.

Because the processing system 202 has multiple command queues $220\_1 \ldots 220\_n$, the processor 208 does not need to wait for the acknowledge signal corresponding to the host command Cmd_i and may directly issue the next host command Cmd_j (j is a number) to the command controller 210 waiting to be transmitted to a storage device $222\_j$. The processor 208 does not need to consider the transfer status of the host command Cmd_i. When the interlink 206 is used to transfer the host command Cmd_i, the host command Cmd_j can be written to the command queue $220\_j$ and the register of the command queue $220\_j$ can be written with related information. Accordingly, the command controller 210 transforms the contents of the command queue $220\_j$ to a transmission format (e.g. according to an AXI protocol) to be transferred, through the interlink 206, when the acknowledgement signal regarding the host command Cmd_i is returned. The host command Cmd_j, therefore, is written to the storage device $222\_j$ of the storage module 218. As long as the interlink 206 is idle, the central processing unit 200 can continuously transfer host commands from the front end (FE) stage to the back end (BE) stage, which results in a high efficiency of host command transfer.

Since the command queues $220\_1 \ldots 220\_n$ correspond to the storages devices $222\_1 \ldots 222\_n$, respectively, the command queues $220\_1 \ldots 220\_n$ can be established in a simplified design. Registers for indicating destination address, effective bits . . . etc. are not necessary. The hardware cost of commands queue is considerably suppressed. The filling of the command queues and the transmission through the interlink 206 are more efficient.

In an exemplary embodiment, the receiving end is in a multi-core architecture. There are multiple processors at the receiving end and each processor is equipped with a storage device for reception of host commands. The storage devices provided on the different processors at the receiving end correspond to the different command queues at the transmitting end (e.g., one to one).

Figure 3:
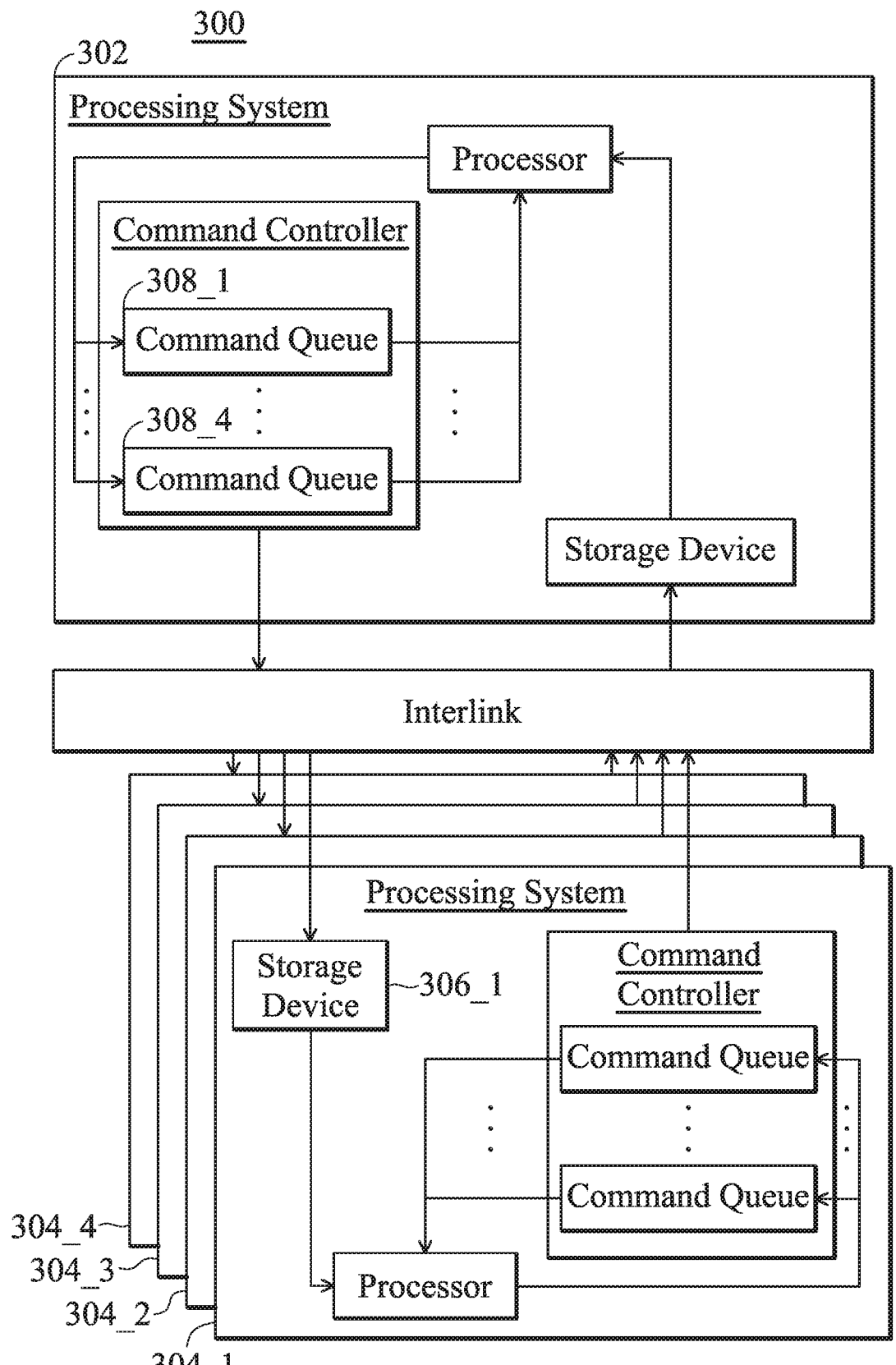
FIG. 3 is a block diagram depicting a central processing unit 300 in accordance with an embodiment of the disclosure, which includes a multi-core back end (BE) stage.

FIG. 3 is a block diagram depicting a central processing unit 300 in accordance with an embodiment of the disclosure. A processing system 302 is within the front end (FE) stage. Processing systems $304\_1 \ldots 304\_4$ form a multi-core back end (BE) stage. The processing systems $304\_1 \ldots 304\_4$ each have a processor and a storage device. The storage devices provided in the different processing systems $304\_1 \ldots 304\_4$ are numbered $306\_1 \ldots 306\_4$, respectively. The command queues $308\_1 \ldots 308\_4$ on the processing system 302 correspond to the processing systems $304\_1 \ldots 304\_4$ one to one, and regard the storage devices $306\_1 \ldots 306\_4$ as the destination for command transmission. To transfer a host command Cmd_i from a command queue $308\_i$ to a storage device $306\_i$ of a processing system $304\_i$ on the storage device $306\_i$, the processing system 302 transforms the contents of the command queue $308\_i$ to a transmission format (e.g. according to an AXI protocol) to be transferred via the interlink. Regardless of the transfer status of the command Cmd_i, the processing system 302 is allowed to push the next host command Cmd_j to the command queue $308\_j$, complete writing the registers of the command queue $308\_j$, and finish the format transformation. When the host command is received by the processing system $304\_i$ and written to the storage device $306\_i$, an acknowledgement signal is returned to the processing system 302. According to the acknowledgement signal returned from the processing system $304\_i$ with respect to the host command Cmd_i, it is determined that the interlink is working normally and then the host command Cmd_j already queued in the command queue $308\_j$ is transferred to the storage device $306\_j$ of the processing system $304\_j$ through the interlink.

The processing system 302 may issue the same commands to different processing systems $304\_1 \ldots 304\_4$. For example, processing system 302 may issue a clock suspending command to stop all of the processing systems $304\_1 \ldots 304\_4$. The filling of the command queues $308\_1 \ldots 308\_4$ does not depend on whether the contents of each other have been successfully transferred to the receiving end through the interlink. A clock suspending command is written to all of the command queues $308\_1 \ldots 308\_4$. The command queues $308\_1 \ldots 308\_4$ are triggered together to transform the queued contents into the transmission form (e.g., according to an AXI protocol) to be transferred, through the interlink, to the processing systems $304\_1 \ldots 304\_4$ at an optimized speed. Almost continuously, clock suspending commands for the different processing systems $304\_1 \ldots 304\_4$ are transferred via the interlink and written to the storage devices 306_1 . . . 306_4. The processing systems 304_1 . . . 304_4, therefore, are almost suspended at the same time.

In one exemplary embodiment, the command queues are operated in a Round Robin scheduling manner to use a communication interface between a transmitting end and a receiving end in turn.

Figure 4:
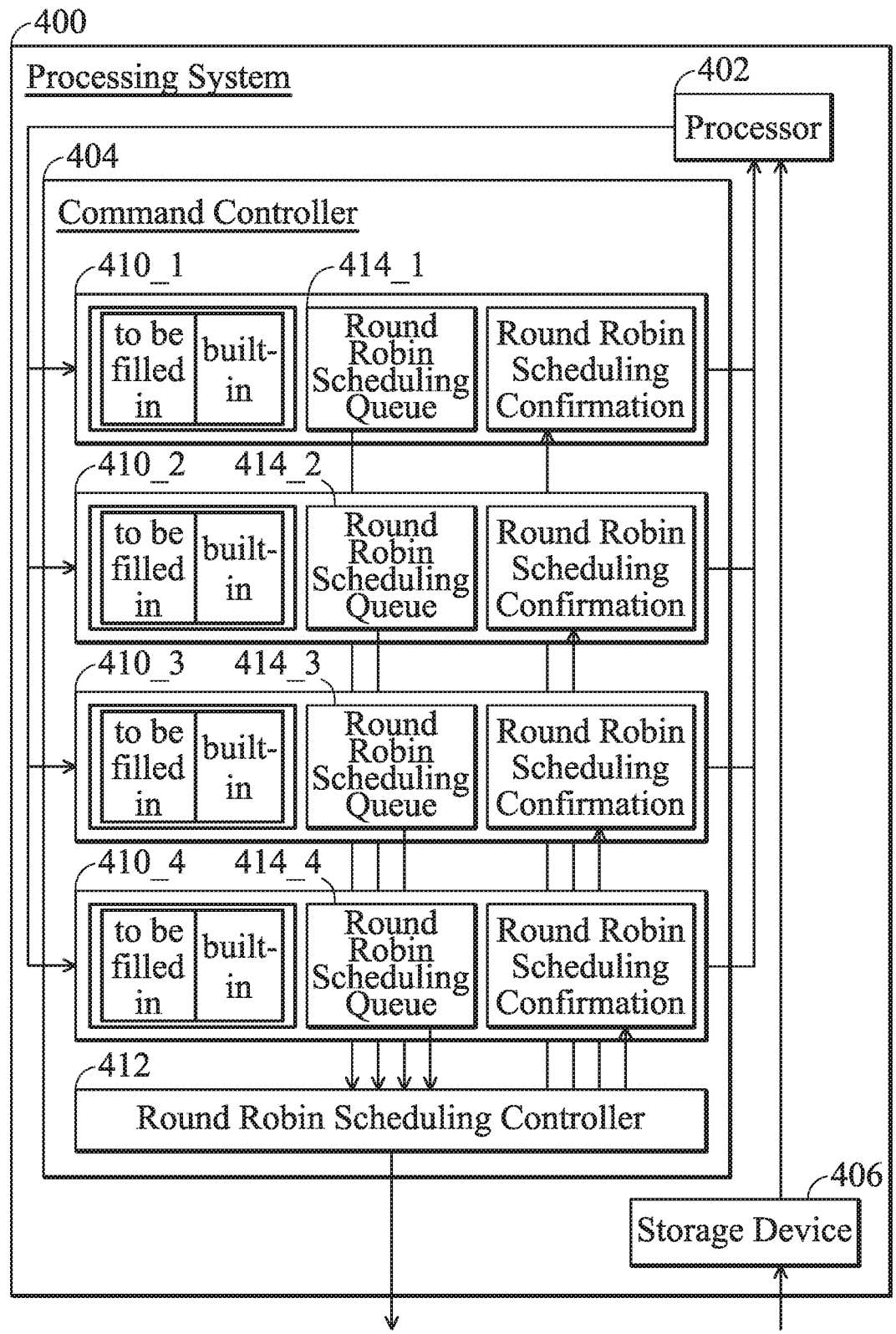
FIG. 4 is a block diagram depicting a processing system 400 in accordance with an embodiment of the disclosure, which includes a command controller 404 operate according to a Round-Robin scheduling technique.

FIG. 4 is a block diagram depicting a processing system 400 in accordance with an embodiment of the disclosure, which includes a processor 402, a command controller 404, and a storage device 406. When the processing system 400 is a transmitting end, the processor 402 provides host commands to the command controller 404 for command transmission. When the processing system 400 is a receiving end, a response command is received and stored in the storage device 406 to be executed or determined by the processor 402. The command controller 404 operates according to a Round Robin scheduling technique.

The command controller 404 includes a plurality of command queues 410_1, 410_2, 410_3, and 410_4, and a Round Robin scheduling controller 412. The command queues 410_1, 410_2, 410_3, and 410_4 use Round Robin scheduling queues 414_1, 414_2, 414_3, and 414_4, respectively. The commands that the processor 402 fills into the command queues 410_1, 410_2, 410_3, and 410_4 are queued in the Round Robin scheduling queues 414_1, 414_2, 414_3, and 414_4. The Round Robin scheduling queues 414_1, 414_2, 414_3, and 414_4 are checked in turn to provide the queued host command to the Round Robin scheduling controller 412 for transmission. The Round Robin scheduling controller 412 may further operate according to an acknowledgement signal returned from the receiving end. The Round Robin scheduling controller 412 uses a confirmation signal to inform the command queues 410_1, 410_2, 410_3, and 410_4 of the acknowledgement signal returned from the receiving end. According to the confirmation signal, the next command queued in the Round Robin scheduling queues 414_1, 414_2, 414_3, and 414_4 is handed to the Round Robin scheduling controller 412 for transmission.

As shown in FIG. 4, the dedicated command queues (i.e., one command queue at the transmitting end corresponds to one storage destination at the receiving end) introduced in the disclosure allows the processor 402 to fill only partial command data to the command queues 410_1, 410_2, 410_3 while the command queues 410_1, 410_2, 410_3 contain built-in command data. The processor 402 may issue a trigger signal after filling command data to a command queue. According to the trigger signal, the filled-in command data is combined with the built-in command data to be transformed into a transmission format and queued in the corresponding Round Robin scheduling queue. According to the trigger signal, the Round Robin scheduling controller 412 is informed that there is a command waiting for transmission.

In an exemplary embodiment, each command queue is in a first-in first-out (FIFO) structure (e.g., implemented by an FIFO buffer), which further enhances command queue capability.

Figure 5:
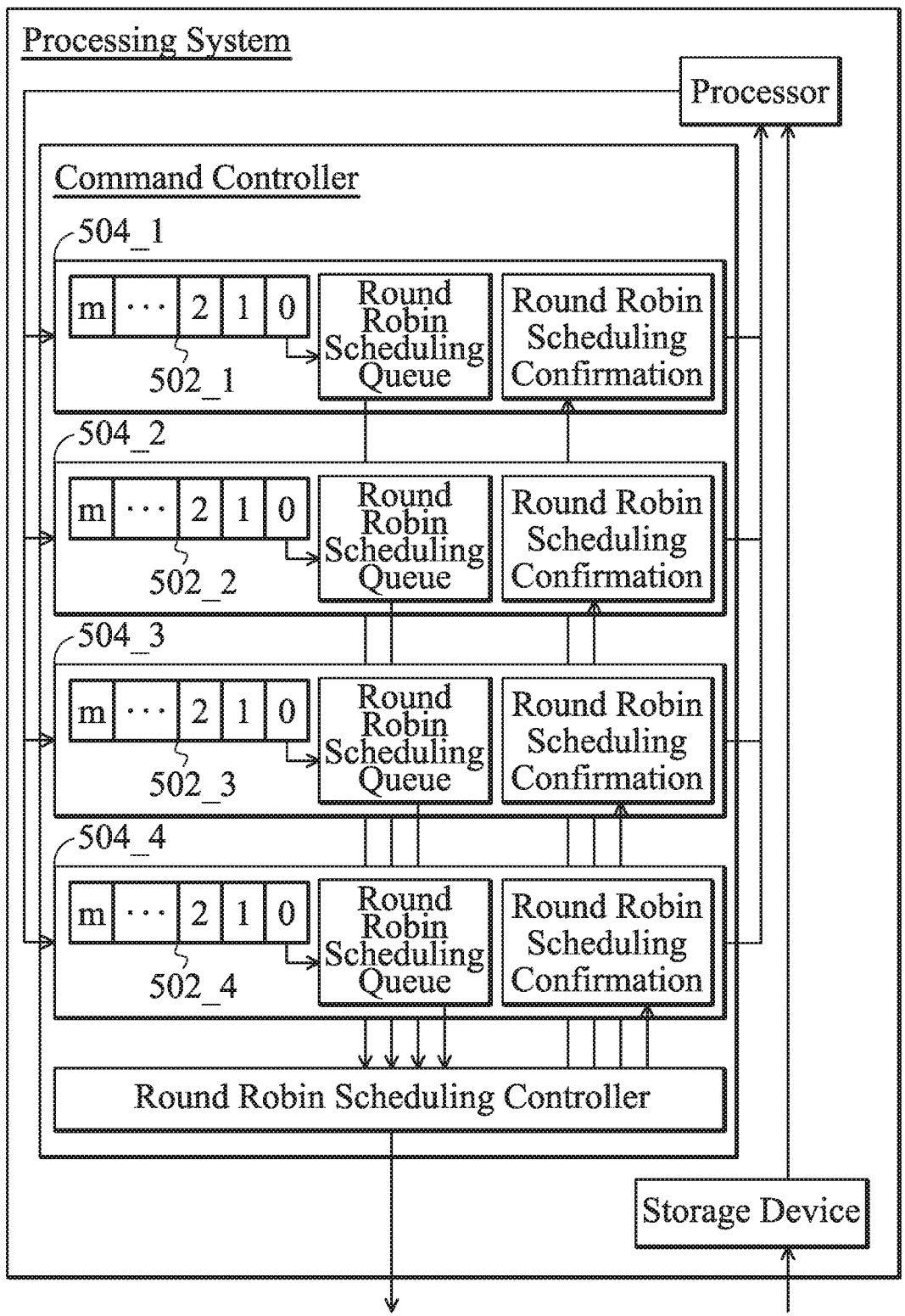
FIG. 5 is a block diagram depicting command queues 504_1, 504_2, 504_3, and 504_4 including first-in first-out (FIFO) buffers 502_1, 502_2, 502_3, and 502_4, respectively, in accordance with an exemplary embodiment of the disclosure.

FIG. 5 is a block diagram depicting command queues 504_1, 504_2, 504_3, and 504_4 including first-in first-out (FIFO) buffers 502_1, 502_2, 502_3, and 502_4, respectively, in accordance with an exemplary embodiment of the disclosure. The command queues 504_1, 504_2, 504_3, and 504_4 with FIFO buffers 502_1, 502_2, 502_3, and 502_4 are more powerful. Multiple host commands can be queued in one command queue. Regardless of the transmission status of the previous host command, the subsequent host commands regarding can be filled in the FIFO buffer.

The multiple command queues of the command controller may correspond to different command attributions (not limited to correspond to different destination storage devices). The different command queues may be provided to correspond to different command functions. A host command can be filled in the corresponding command queue without writing the command attribution to the command queue.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a non-volatile memory; and
   a controller, operating the non-volatile memory and including a central processing unit,
   wherein:
   the central processing unit has a multi-stage architecture, and different processing systems of the different stages communicate with each other;
   in a first processing system within the central processing unit of the controller of the data storage device, a command controller is provided to implement the first processing system as a transmitting end, and the command controller includes a plurality of command queues;
   when a first command is queued in a first command queue within the command controller for transmission, a first processor of the first processing system fills a second command into a second command queue within the command controller for transmission;
   after transferring the first command queued in the first command queue to a receiving end, implemented by another processing system in another stage, through a communication interface, the command controller waits for an acknowledgement signal from the receiving end to confirm the transfer of the first command;
   after receiving the acknowledgement signal, the command controller uses the communication interface to transfer the second command queued in the second command queue to output the second command from the first processing system without holding the second command to wait for a complete execution of the first command; and
   the communication interface is an Advanced Extensible Interface.

2. The data storage device as claimed in claim 1, wherein:
   the first command queue corresponds to a first storage device, and the first command queued in the first command queue and transmitted from the first processing system regards the first storage device as destination; and
   the second command queue corresponds to a second storage device, and the second command queued in the second command queue and transmitted from the first processing system regards the second storage device as destination.

3. The data storage device as claimed in claim 2, further comprising:
- a second processing system within the central processing unit of the controller of the data storage device, having a second processor as well as the first storage device;
- the first command transferred to the first storage device is accessed and executed by the second processor;
- a third processing system within the central processing unit of the controller of the data storage device, having a third processor as well as the second storage device; and
- the second command transferred to the second storage device is accessed and executed by the third processor.

4. The data storage device as claimed in claim 1, wherein:
commands queued in the command queues of the command controller are alternately transferred through the communication interface in a Round Robin scheduling manner.

5. The data storage device as claimed in claim 1, wherein:
- the command controller includes a Round Robin scheduling controller; and
- each of the command queues of the command controller has a Round Robin scheduling queue for queuing commands; and
- the commands queued in each Round Robin scheduling queue are accessed by the Round Robin scheduling controller to be transferred through the communication interface.

6. The data storage device as claimed in claim 1, wherein:
the command queues correspond to different command attributions and are provided to separate the commands of the different command attributions.

7. The data storage device as claimed in claim 6, wherein:
- each of the command queues includes a first-in first-out buffer; and
- commands of the same command attribution are queued in the same first-in first-out buffer.

8. The data storage device as claimed in claim 6, wherein:
each command is pushed into the corresponding command queue without writing information regarding command attribution to the corresponding command queue.

* * * * *